(12) United States Patent
Hase

(10) Patent No.: US 7,287,724 B2
(45) Date of Patent: Oct. 30, 2007

(54) TETHER SYSTEM FOR BALLOON RIDE

(75) Inventor: Douglas A. Hase, Boston, MA (US)

(73) Assignee: Aeroballoon USA, Inc., Boston, MA (US)

( * ) Notice: Subject to any disclaimer, the term of this patent is extended or adjusted under 35 U.S.C. 154(b) by 0 days.

(21) Appl. No.: 11/158,108

(22) Filed: Jun. 21, 2005

(65) Prior Publication Data
US 2006/0214053 A1 Sep. 28, 2006

Related U.S. Application Data

(60) Provisional application No. 60/665,047, filed on Mar. 25, 2005.

(51) Int. Cl.
*B64B 1/50* (2006.01)

(52) U.S. Cl. .......................... 244/33; 244/30

(58) Field of Classification Search .......... 244/30–33
See application file for complete search history.

(56) References Cited

U.S. PATENT DOCUMENTS

| | | | |
|---|---|---|---|
| 1,302,007 A * | 4/1919 | Calthrop | 244/33 |
| 1,341,248 A * | 5/1920 | Opson | 244/33 |
| 1,629,374 A * | 5/1927 | Avorio | 244/30 |
| 1,784,954 A * | 12/1930 | Alvistur | 244/16 |
| 3,448,864 A * | 6/1969 | Fenn et al. | 212/71 |
| 5,449,130 A | 9/1995 | Huntington | |
| 5,813,627 A | 9/1998 | Huntington | |
| 6,227,484 B1 | 5/2001 | Miyake | |

* cited by examiner

*Primary Examiner*—Tien Dinh
(74) *Attorney, Agent, or Firm*—Preti Flaherty Beliveau & Pachios LLP

(57) ABSTRACT

A tether system for use in a balloon ride having a balloon envelope and a gondola includes a tether connected to the balloon ride to prevent free flight. The system includes structure for offsetting the gondola from the tether so as to enable use of a smaller, lighter, less costly gondola and better minimize gondola tilt. In one embodiment, the structure has first, second and third connection points, wherein the balloon envelope is pivotally connected to the first connection point, the gondola is pivotally connected to the second connection point, and the tether is pivotally connected to the third connection point. In another embodiment, the tether system includes a load ring attached to the gondola and a plurality of envelope lines extending between the envelope and the load ring. The tether is connected so as to be offset from the gondola.

16 Claims, 7 Drawing Sheets

TETHER SYSTEM FOR BALLOON RIDE

CROSS REFERENCES TO RELATED APPLICATIONS

This application claims the benefit of U.S. Provisional Application Ser. No. 60/665,047, filed Mar. 25, 2005.

BACKGROUND OF THE INVENTION

This invention relates generally to lighter-than-air balloons and more particularly to tether systems for balloon rides.

Tethered balloon amusement rides have become a popular alternative to traditional, free-flying hot-air balloon rides. A tethered balloon system typically includes a balloon, a passenger-carrying gondola (also referred to as a "basket"), and one or more tethers (e.g., cables, ropes, lines or the like) that hold the balloon in a confined area, limit the extent of rise of the balloon and prevent the balloon from achieving free flight. While free-flying hot-air balloon rides are available to the public in many localities, the cost for such rides is generally quite high. A tethered balloon amusement ride provides the opportunity to experience ballooning in or near central metropolitan areas and at a lower per passenger cost.

One common balloon tethering system is a multi-point system using a number of tethers, typically three or more. In this case, each tether has one end secured to the ground and the other end attached to a point on the balloon, such as the top of the gondola. The tethers are spaced around the balloon so as to restrain movement in all directions horizontally and limit the balloon's rise. Such multi-point tethering systems are effective but require an excessive amount of ground area and tend to be difficult to operate.

Single tether systems are also known. A current design utilizes a spherical balloon envelope and an annular or donut-shaped gondola having a large opening or hole in the center. The large opening allows a single tether to pass through the center of the gondola and attach directly to the envelope via a load-bearing ring. The result is that the gondola structure itself does not bear the burden of the working loads; the working loads bypass the gondola and are handled by components better suited to handling such loads. These systems are designed to carry large numbers of people, such as up to 30 passengers at a time. In one design, the diameter of the central opening in the gondola is 13 feet, and the balloon envelope is 72 feet in diameter. Large volumes of passengers are needed to cover the considerable manufacturing, startup, and operating expenses for such systems.

When operating in calm winds, the envelope and gondola rest directly above the ground connection point, held securely by the tether. The tether is oriented vertically, centered in the central opening of the gondola. When the wind blows, the envelope and gondola are displaced in the direction of the wind and are no longer directly over the ground connection point of the tether. This displacement will cause the tether to be deflected or slanted off vertical. In response to the deflection of the tether, the load ring to which the tether is attached will tilt. Because the gondola is also suspended from this load ring via its own cables, the gondola will tilt as well, potentially unnerving the passengers. If the balloon is displaced to the extent that the tether is deflected approximately 30 degrees from vertical, the tether comes into contact with the inside of the gondola center opening, which can cause extreme and unsafe tilting of the gondola.

Accordingly, there is a need for a balloon amusement ride tether system that enables use of a smaller, lighter, less costly gondola and that better minimizes gondola tilt.

SUMMARY OF THE INVENTION

The above-mentioned need is met by the present invention, which provides a tether system for use in a balloon ride having a balloon envelope and a gondola. The tether system includes a tether connected to the balloon envelope to prevent free flight and means for offsetting the gondola from the tether. This offset enables use of a smaller, lighter, less costly gondola and better minimizes gondola tilt. In one embodiment, the tether system includes a hanger having first, second and third connection points, wherein the balloon envelope is pivotally connected to the first connection point, the gondola is pivotally connected to the second connection point, and the tether is pivotally connected to the third connection point.

In another embodiment, the tether system includes a load ring attached to the gondola and a plurality of envelope lines extending between the envelope and the load ring, wherein the tether is connected to the load ring so as to be offset from the gondola.

In yet another embodiment, the tether system includes a load ring attached to the gondola and a plurality of load lines extending between the envelope and the load ring. The system further includes a plurality of equilibrium lines connected at one end to the envelope and connected together at the other end at a vertex that is offset or laterally spaced from the load ring. The tether is connected to the vertex so as to be offset from the gondola.

In still another embodiment, the tether system includes a load ring attached to the gondola and a plurality of load lines extending between the envelope and the load ring. The system further includes a plurality of equilibrium lines connected at one end to the envelope and connected together at the other end at a vertex that is offset or laterally spaced from the load ring. A guide line extends between the vertex and the load ring, and the tether is slidingly connected to the guide line so as to be offset from the gondola.

The present invention and its advantages over the prior art will be more readily understood upon reading the following detailed description and the appended claims with reference to the accompanying drawings.

DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
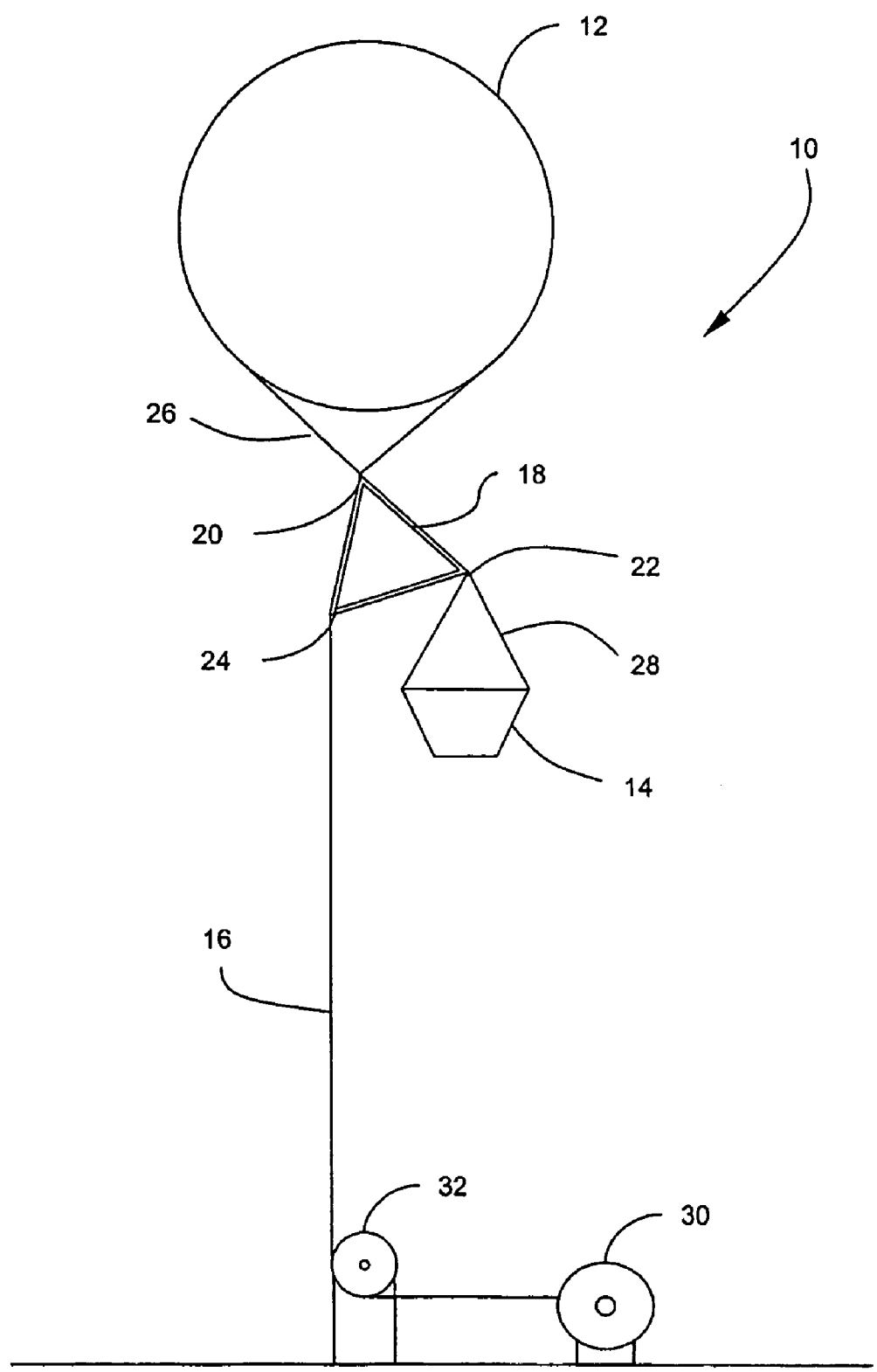
FIG. 1 is a schematic view of a tethered balloon amusement ride operating in calm conditions.
Figure 2:
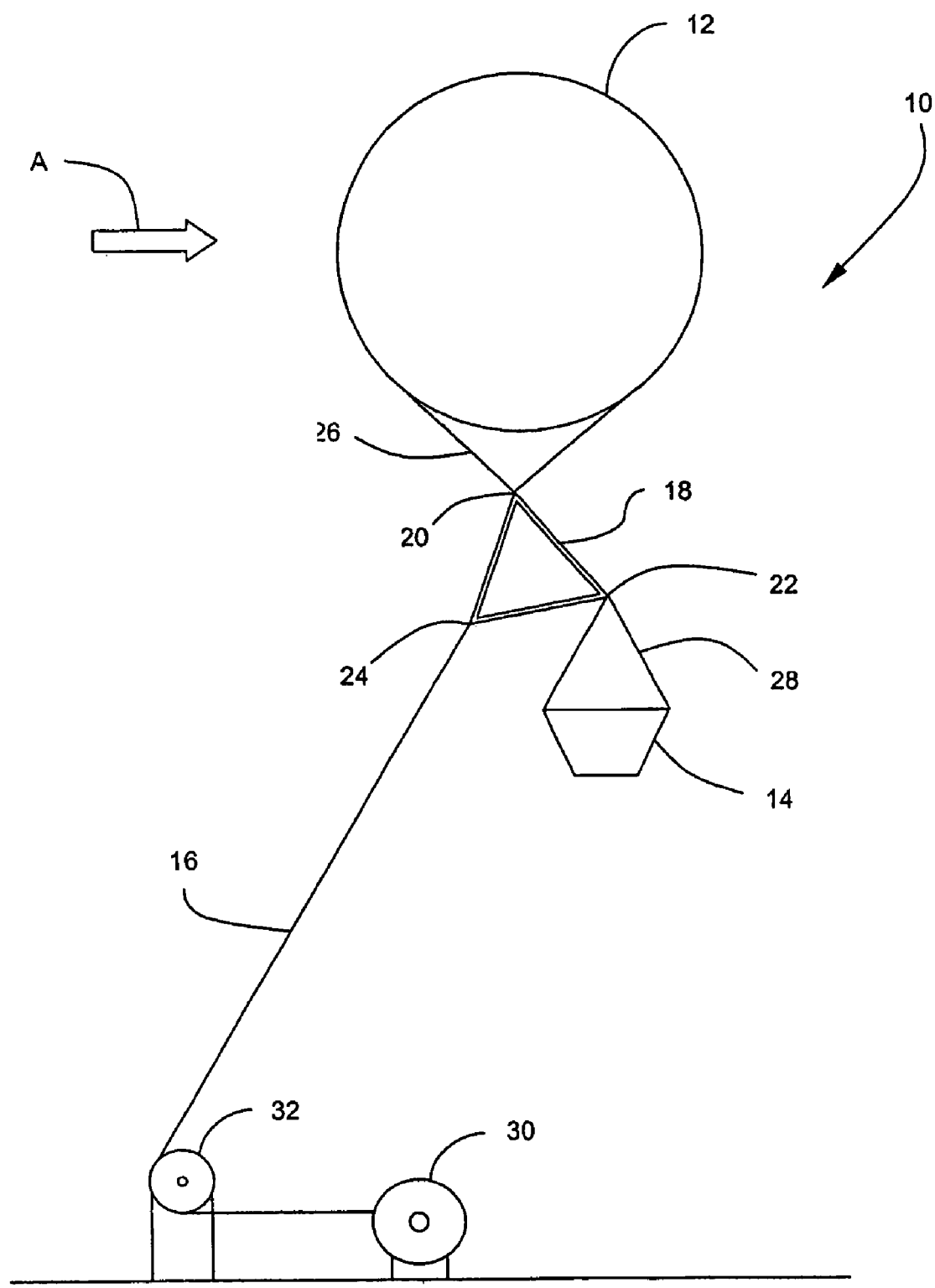
FIG. 2 is a schematic view of the tethered balloon amusement ride operating in windy conditions.

Referring to the drawings wherein identical reference numerals denote the same elements throughout the various views, FIGS. 1 and 2 shown a tethered balloon amusement ride 10. The tethered balloon ride 10 includes a balloon envelope 12, a gondola 14 and a tether 16 that prevents the balloon ride 10 from achieving free flight. The gondola 14 depends from the envelope 12 by means of a hanger 18. The hanger 18 is a rigid structural component that laterally spaces the gondola 14 from the tether 16 during operation of the balloon ride 10. In the illustrated embodiment, the hanger 18 has a triangular configuration with three connection points 20, 22, 24. The balloon envelope 12 is pivotally connected to the hanger 18 at the first connection point 20 by a series of envelope lines 26, which can comprise cables, ropes or the like. The gondola 14 is pivotally connected to the hanger 18 at the second connection point 22 by a series of gondola lines 28, which also can comprise cables, ropes or the like.

A first end of the tether 16 is pivotally connected to the hanger 18 at the third connection point 24, and is thus indirectly connected to the envelope 12. The other end of the tether 16 is attached to a winch 30 that is anchored on the ground, thereby securing the entire balloon ride 10 to the ground. The tether 16, which can be a cable, rope, line or the like, passes over a pulley 32 so that the portion of the tether 16 between the pulley 32 and the hanger 18 assumes a generally upright orientation, which can be vertical or angled from vertical depending on local wind strength. The winch 30 is able to play out (deploy) and/or take up (retract) the tether 16, in order to allow the envelope 12 to rise or to lower the envelope 12, respectively. With this arrangement, the balloon ride 10 is capable of carrying passengers riding in the gondola 14 to a desired height above the ground (such as up to 1500 feet or higher, by way of example) before being reeled back down by the winch 30. The maximum height of rise is limited by the length of the tether 16.

The envelope 12 is inflated with a lighter-than-air gas such as helium, hydrogen or hot air to provide the lift to the ride 10. The envelope 12 can be made of any suitable fabric glued, welded, or sewn together. Preferably, the envelope 12 is a sealed envelope that is typically, but not necessarily, spherical in shaped. A non-sealed envelope, such as the type having an opening positioned over a burner so that the air in the envelope can be heated, can be used in the present invention but such envelopes are generally less effective for a tethered ride. This is because wind pushing on a non-sealed envelope that is restrained from moving laterally will cause the hot air inside of the envelope to be pushed out of the opening, leading to the envelope possibly deflating.

During operation of the balloon ride 10, the hanger 18 statically displaces or offsets the gondola 14 to the side and clear of the tether 16, wherever the balloon ride 10 may drift in the sky while attached to the tether 16. FIG. 1 depicts the balloon ride 10 during calm conditions with little or no wind. In this case, the balloon envelope 12 is directly above the pulley 32. The gondola lines 28 allow the gondola 14 to be freely suspended below the second connection point 22 of the hanger 18, spaced laterally from the tether 16.

FIG. 2 depicts the balloon ride 10 during windy conditions. In this case, the balloon envelope 12 is pushed laterally in the direction of the wind (represented by arrow A) so that the balloon envelope 12 is no longer directly above the pulley 32. This will cause the tether 16 to be deflected or slanted off vertical; the extent of the angular deflection of the tether 16 will depend on the strength of the wind. The gondola 14 will typically be pushed to the downwind side of the tether 16 (as the rigid hanger 18 rotates around the tether 16), remaining to the side and clear of the tether 16 due to the lateral offset created by the hanger 18. Because the gondola 14 is freely suspended by an independent point from the hanger 18, the gondola 14 continues to hang in a vertical state as caused by gravity, despite the angular deflection of the tether 16. In other words, even though the deflection of the tether 16 may cause the hanger 18 to tilt, the pivotal connection between the gondola 14 and the hanger 18 allows the gondola 14 to hang in a comfortable upright position with zero tilt. Furthermore, because the hanger 18 laterally offsets the gondola 14 from the tether 16, there is no contact between the tether 16 and the gondola 14 regardless of the angle of tether deflection. Thus, there is no tilt of the gondola 14 caused by physical contact of the gondola 14 with the tether 16.

Figure 3:
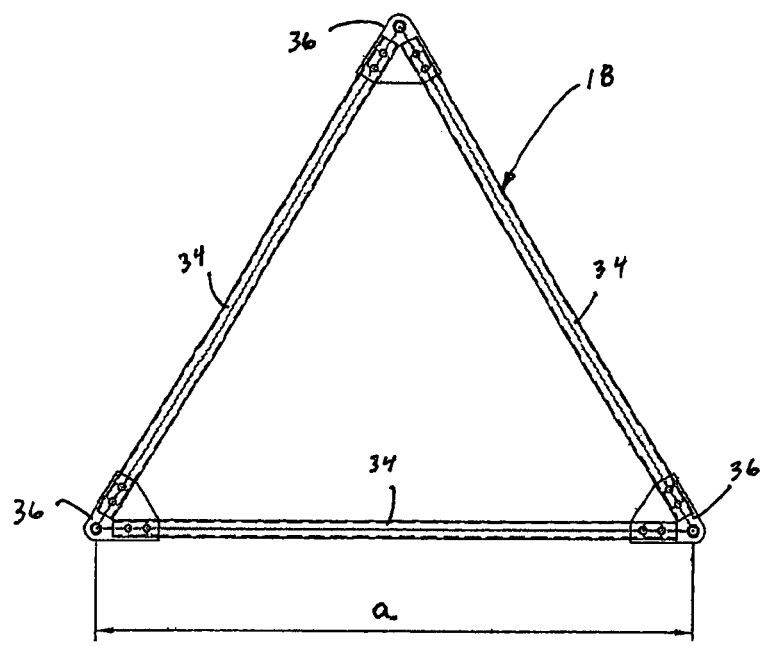
FIG. 3 is a front view of one embodiment of a hanger for use in a tether system for a balloon amusement ride.
Figure 4:
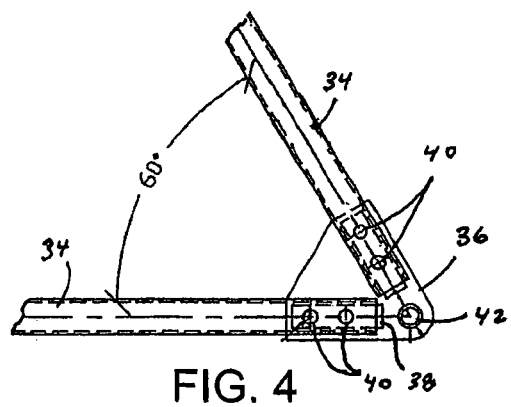
FIG. 4 is an enlarged, partial front view of one corner of the hanger of FIG. 3.
Figure 5:
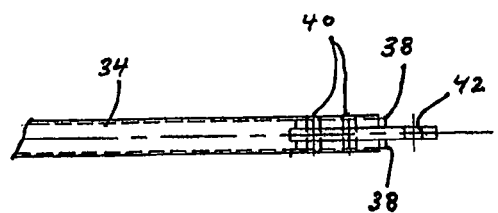
FIG. 5 is an enlarged, partial side view of one corner of the hanger of FIG. 3.

Referring now to FIGS. 3-5, one embodiment of the hanger 18 is shown in greater detail. In this embodiment, the hanger 18 has a triangular frame construction comprising three bars 34 joined together at corresponding ends to form the triangular shape. The bars 34 are joined by three connector plates 36 but alternatively could be joined together by other means such as welding. The bars 34 are formed from lengths of square tubing having transverse slots formed in each end for receiving the corresponding connector plate 36 therein. The bars 34 and connector plates 36 can be made from any suitable material including, but not limited to, aluminum, steel, fiber-based composite materials (including glass, carbon, and Kevlar (the trade name of an aramid fiber) fibers), plastics, etc. A spacer 38 is inserted into the tubing end above and below each connector plate 36 to insure a tight fit. The respective ends of the bars 34 are then fastened to the corresponding connector plate 36 with a suitable fastener such as a pair of bolts 40. In this case, the bars 34 are of equal length such that the hanger 18 defines an equilateral triangle having sides of length a. The length a can be any suitable value but in one embodiment is 50 inches. The connector plates 36 are configured to position adjacent bars 34 so as to define 60-degree angles therebetween. However, it should be noted that the hanger 18 is not limited to an equilateral triangle configuration.

Each connector plate 36 has a hole 42 formed in the outer corner thereof for defining the pivotal connections 20, 22, 24. For instance, the envelope lines 26 can be pivotally connected to the hole 42 that comprises the first connection point 20 by looping one end of the envelope lines 26 through the hole 42. This will secure the envelope lines 26 to the connector plate 36 while allowing them to freely pivot with respect to the connector plate 36. Similarly, the gondola lines 28 can be looped through the hole 42 corresponding to the second connection point 22, and the end of the tether 16 can be looped through the hole 42 corresponding to third connection point 24.

While one configuration has been described in detail, it should be noted that the hanger 18 could comprise any structure capable of avoiding gondola tilt and laterally offsetting the gondola 14 from the tether 16. For example, instead of being a triangular frame, the hanger 18 could be a solid plate having a triangular configuration and holes formed at or near the corners to provide the three connection points. Configurations other than triangular, such as rectangular, circular, etc., could be used as well.

Unlike prior art single tether systems, the present invention provides near zero gondola tilt regardless of the angle of the tether, whether the tether runs vertical in calm winds or is significantly deflected (e.g., up to 35 degrees) in moderate winds. Specifically, the present invention avoids or minimizes gondola tilt caused by tether deflection in light winds and gondola tilt caused by physical contact between the tether and the gondola in stronger winds. A further advantage is that the present invention eliminates the need for the large, heavy, and expensive gondolas commonly used today, thus enabling use of a smaller, lighter and more cost effective gondola. Because the gondola is offset or displaced to the side of the tether, a donut-shaped gondola having a large center opening is no longer necessary. Thus, a smaller and lighter gondola having a continuous base (i.e., a base without a hole formed therein) may be used, with the weight saved now available to carry additional passengers in the payload. In addition, a smaller gondola, without an elaborate open hole in the center, costs significantly less. This makes it financially viable to operate a tethered balloon amusement ride with lower passenger volumes, such as 3-15 passengers at a time. In addition to smaller gondolas, the present invention enables use of gondolas having non-circular configurations.

Figure 6:
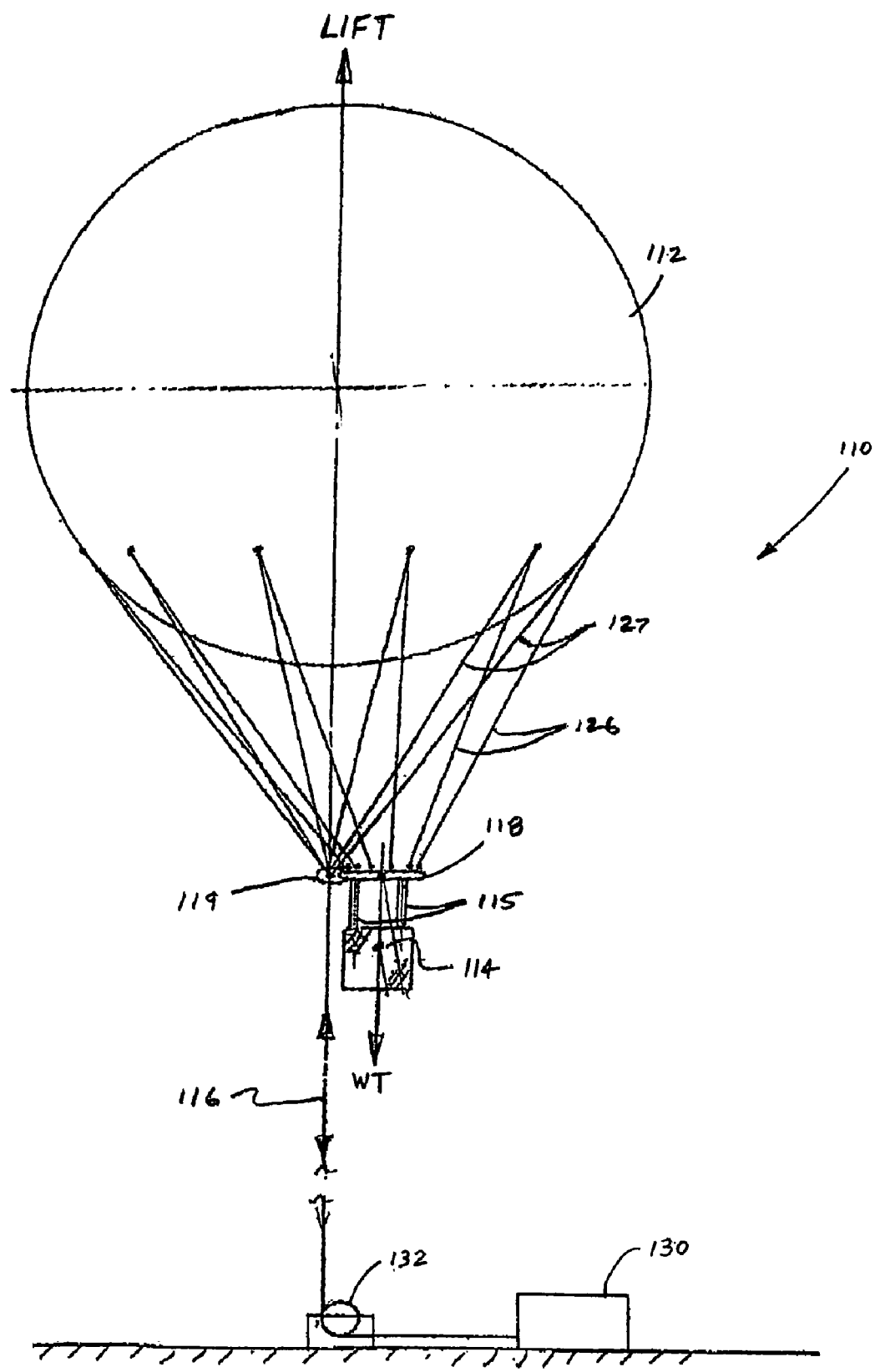
FIG. 6 is a schematic view showing another embodiment of a tethered balloon amusement ride operating in calm conditions.
Figure 7:
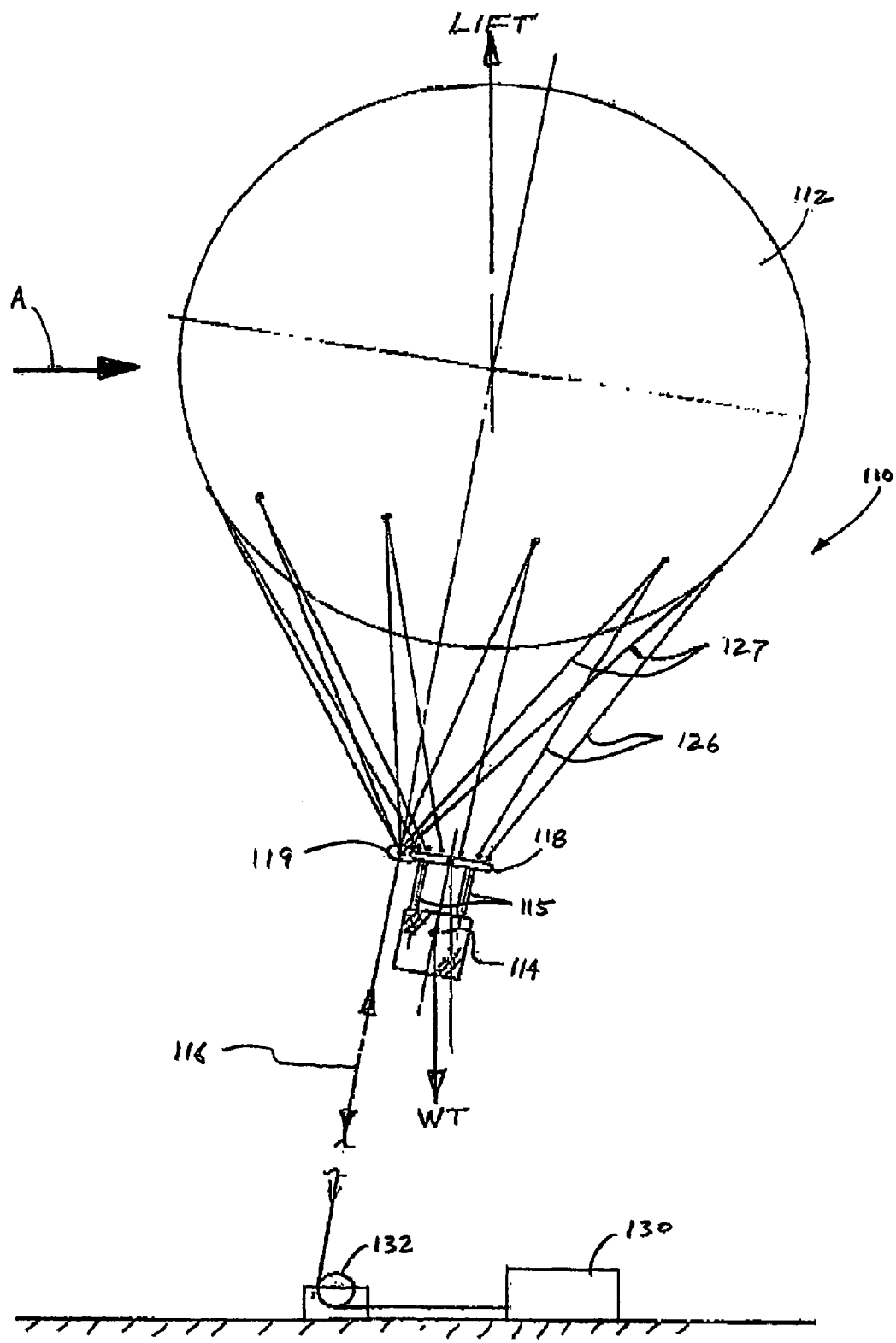
FIG. 7 is a schematic view showing the tethered balloon amusement ride of FIG. 6 operating in windy conditions.

Turning to FIGS. 6 and 7, a second embodiment of a tethered balloon amusement ride is shown. The tethered balloon ride 110 includes a balloon envelope 112, a gondola 114 and a tether 116 that prevents the balloon ride 110 from achieving free flight. The gondola 114 depends from the envelope 112 by means of a load ring 118. The load ring 118 is a rigid structural component that is attached to and supported above the gondola 114 by upright members 115. The balloon envelope 112 is connected to the load ring 118 by a series of envelope lines, which can comprise cables, ropes or the like. The envelope lines include a plurality of load lines 126 and a plurality of equilibrium lines 127.

A first end of each load line 126 is connected to the envelope 112, and a second end of each load line 126 is connected to the load ring 118. The second ends of the load lines 126 are connected to the load ring 118 at various points distributed around the load ring 118. The load line connection points are preferably spaced equally around the load ring 118. A first end of each equilibrium line 127 is connected to the envelope 112 (typically at a common point with a corresponding one of the load lines 126), and a second end of each equilibrium line 127 is connected to the load ring 118. The second ends of the equilibrium lines 127 are all connected at a vertex or common point on the load ring 118. In the illustrated embodiment, this common connection point for the equilibrium lines 127 is located on an extension 119 that extends laterally from the circular portion of the load ring 118. The extension 119 can be either integrally formed with the load ring 118 or a separate piece that is fixedly attached thereto.

A first end of the tether 116 is also connected to the extension 119 of the load ring 118, and is thus indirectly connected to the envelope 112. The arrangement of the load ring 118 and the envelope lines, with the tether 116 and the equilibrium lines 127 connected to the extension 119, laterally spaces or offsets the gondola 114 from the tether 116 during operation of the balloon ride 110. The load lines 126 and the equilibrium lines 127 are varied in length to accommodate the offset of the gondola 114 from the tether 116.

As in the first-described embodiment, the other end of the tether 116 is attached to a winch 130 that is anchored on the ground, thereby securing the entire balloon ride 110 to the ground. The tether 116, which can be a cable, rope, line or the like, passes over a pulley 132 so that the portion of the tether 116 between the pulley 132 and the load ring 118 assumes a generally upright orientation, which can be vertical or angled from vertical depending on local wind strength. The winch 130 is able to play out (deploy) and/or take up (retract) the tether 116, in order to allow the envelope 112 to rise or to lower the envelope 112, respectively. With this arrangement, the balloon ride 110 is capable of carrying passengers riding in the gondola 114 to a desired height above the ground (such as up to 1500 feet or higher, by way of example) before being reeled back down by the winch 130. The maximum height of rise is limited by the length of the tether 116. The envelope 112 is inflated with a lighter-than-air gas such as helium, hydrogen or hot air to provide the lift to the ride 110 and is preferably, although not necessarily, a sealed envelope.

During operation of the balloon ride 110, the load ring 118, load lines 126 and equilibrium lines 127 displace or offset the gondola 114 to the side and clear of the tether 116, wherever the balloon ride 110 may drift in the sky while attached to the tether 116. FIG. 6 depicts the balloon ride 110 during calm conditions with little or no wind. In this case, the balloon envelope 112 is directly above the pulley 132, and the gondola 114 is suspended below the load ring 118, spaced laterally from the tether 116.

FIG. 7 depicts the balloon ride 110 during windy conditions. In this case, the balloon envelope 112 is pushed laterally in the direction of the wind (represented by arrow A) so that the balloon envelope 112 is no longer directly above the pulley 132. This will cause the tether 116 to be deflected or slanted off vertical; the extent of the angular deflection of the tether 116 will depend on the strength of the wind. The deflection of the tether 116 will cause the load ring 118 to tilt, which in turn will cause a slight tilting of the gondola 114, as depicted in FIG. 7. However, because the gondola 114 is laterally offset from the tether 116, there is no contact between the tether 116 and the gondola 114 regardless of the angle of tether deflection. Accordingly, tilting of the gondola 114 is limited to tilting caused by load ring tilting, and severe tilting caused by physical contact of the gondola 114 with the tether 116 is avoided.

Figure 8:
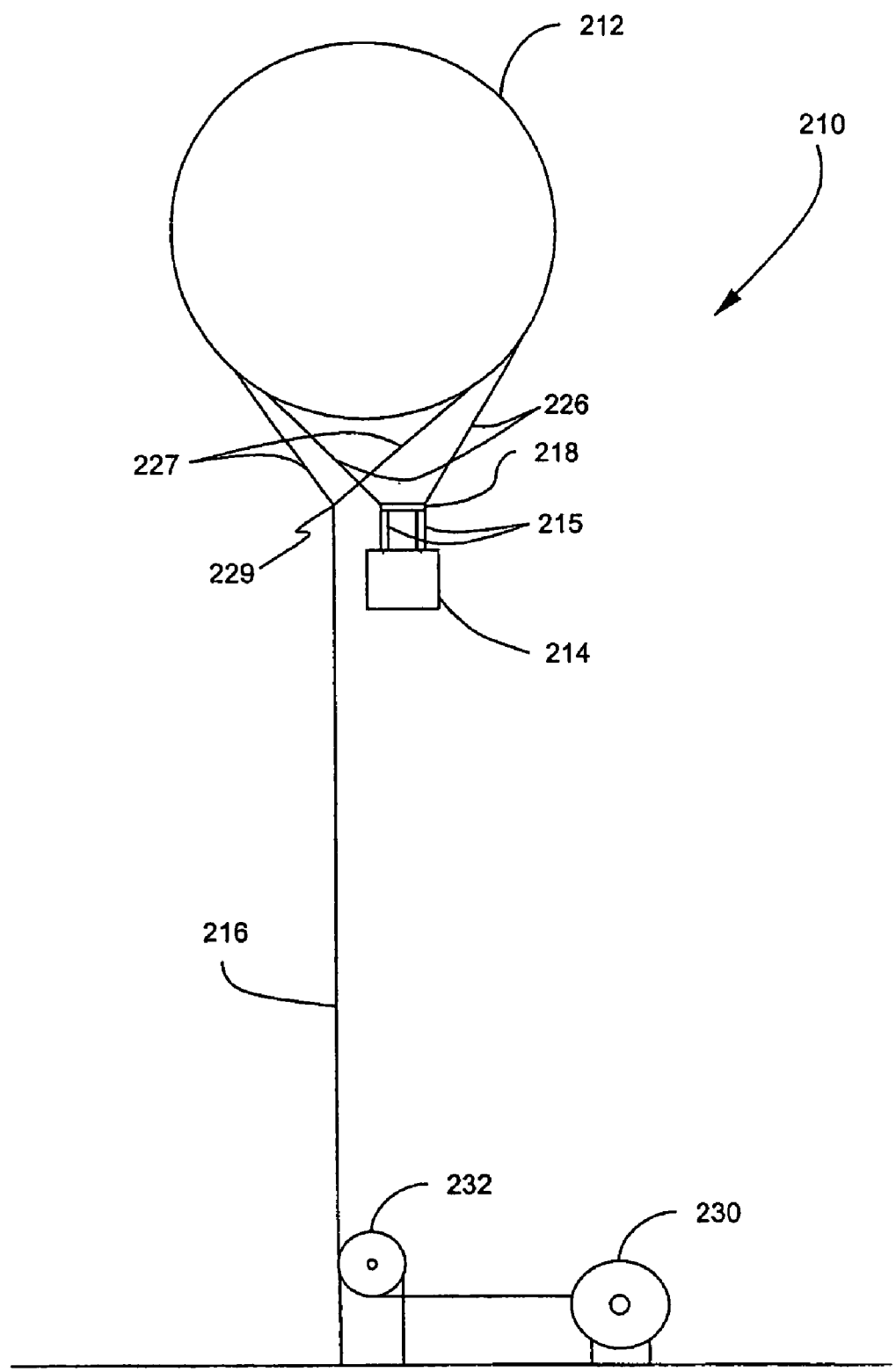
FIG. 8 is a schematic view showing yet another embodiment of a tethered balloon amusement ride.

FIG. 8 shows a tethered balloon amusement ride 210 that is a variation of the second embodiment. In this case, the balloon ride 210 includes a balloon envelope 212, a gondola 214 and a tether 216. The gondola 214 depends from the envelope 212 by means of a load ring 218. The load ring 218 is a rigid structural component that is attached to and supported above the gondola 214 by upright members 215. The balloon envelope 212 is connected to the load ring 218 by a series of envelope load lines 226, which can comprise cables, ropes or the like. A first end of each load line 226 is connected to the envelope 212, and a second end of each load line 226 is connected to the load ring 218. The second ends of the load lines 226 are connected to the load ring 218 at various points distributed around the load ring 218. The load line connection points are preferably spaced equally around the load ring 218.

The ride 210 further includes a plurality of equilibrium lines 227. A first end of each equilibrium line 227 is connected to the envelope 212. The second ends of the equilibrium lines 227 are all connected together at a vertex 229 that is offset or laterally spaced from the load ring 218. The equilibrium lines 227 are varied in length to produce the offset between the vertex 229 and the load ring 218. The load lines 226 can also be varied in length. A first end of the tether 216 is connected to the vertex 229 so that the tether 216 is offset from the gondola 214 during operation of the balloon ride 210.

As before, the other end of the tether 216 is attached to a winch 230 that is anchored on the ground, thereby securing the entire balloon ride 210 to the ground. The tether 216, which can be a cable, rope, line or the like, passes over a, pulley 232 so that the portion of the tether 216 between the pulley 232 and the vertex 229 assumes a generally upright orientation, which can be vertical or angled from vertical depending on local wind strength. The winch 230 is able to play out (deploy) and/or take up (retract) the tether 216, in order to allow the envelope 212 to rise or to lower the envelope 212, respectively. With this arrangement, the balloon ride 210 is capable of carrying passengers riding in the gondola 214 to a desired height above the ground before being reeled back down by the winch 230. The maximum height of rise is limited by the length of the tether 216. The envelope 212 is inflated with a lighter-than-air gas such as helium, hydrogen or hot air to provide the lift to the ride 210 and is preferably, although not necessarily, a sealed envelope.

During operation of the balloon ride 210, the load ring 218, load lines 226 and equilibrium lines 227 displace or offset the gondola 214 to the side and clear of the tether 216, wherever the balloon ride 210 may drift in the sky while attached to the tether 216. During calm conditions with little or no wind, the balloon envelope 212 is directly above the pulley 232 (as shown in FIG. 8), and the gondola 214 is suspended below the load ring 218, spaced laterally from the tether 216. During windy conditions, the balloon envelope 212 is pushed laterally in the direction of the wind so that the balloon envelope 212 is no longer directly above the pulley 232. This will cause the tether 216 to be deflected or slanted off vertical; the extent of the angular deflection of the tether 216 will depend on the strength of the wind. The deflection of the tether 216 may cause a slight tilting of the gondola 214. However, because the gondola 214 is laterally offset from the tether 216, there is no contact between the tether 216 and the gondola 214 regardless of the angle of tether deflection. Accordingly, tilting of the gondola 214 is minimized because severe tilting caused by physical contact of the gondola 214 with the tether 216 is avoided.

Figure 9:
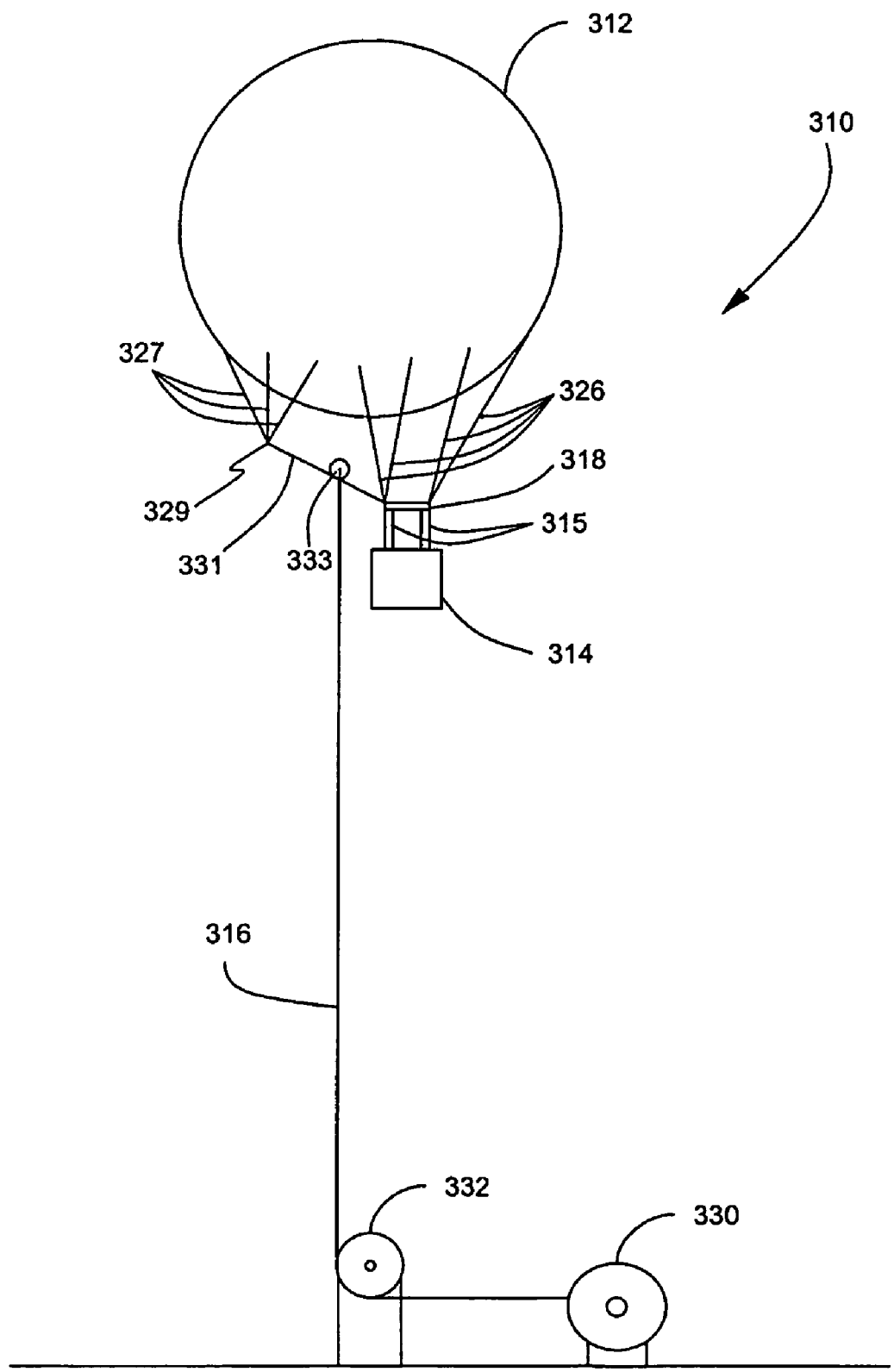
FIG. 9 is a schematic view showing still another embodiment of a tethered balloon amusement ride.

Referring to FIG. 9, yet another embodiment of a tethered balloon amusement ride is shown. In this embodiment, the balloon ride 310 includes a balloon envelope 312, a gondola 314 and a tether 316. The gondola 314 depends from the envelope 312 by means of a load ring 318. The load ring 318 is a rigid structural component that is attached to and supported above the gondola 314 by upright members 315. The balloon envelope 312 is connected to the load ring 318 by a series of envelope load lines 326, which can comprise cables, ropes or the like. A first end of each load line 326 is connected to the envelope 312, and a second end of each load line 326 is connected to the load ring 318. The second ends of the load lines 326 are connected to the load ring 318 at various points distributed around the load ring 318. The load line connection points are preferably spaced equally around the load ring 318.

The ride 310 further includes a plurality of equilibrium lines 327. A first end of each equilibrium line 327 is connected to the envelope 312. The second ends of the equilibrium lines 327 are all connected together at a vertex 329 that is offset or laterally spaced from the load ring 318. The equilibrium lines 327 can be varied in length to produce the offset between the vertex 329 and the load ring 318. The load lines 326 can also be varied in length. A guide line 331 extends between the vertex 329 and a point on the load ring 318.

A first end of the tether 316 is slidingly connected to the guide line 331 by a sliding element 333. In the illustrated embodiment, the sliding element 333 is a pulley that is secured to the first end of the tether 316 and arranged to slide along the guide line 331. However, the sliding element 333 can be any device capable of freely sliding along the guide line 331, such as a ring, a carabiner or the like. With this arrangement, the sliding element 333 will slide along the guide line 331 as the tether 316 slants in response to the balloon ride 310 drifting laterally, thereby insuring that the tether 316 remains offset from the gondola 314 during operation of the balloon ride 310. The sliding device's range of motion can be the entire length of the guide line 331, although a stop (not shown) can be provided on the guide line 331 near the point of connection to the load ring 318 to assure that the tether 316 will be spaced from the load ring 318.

As before, the other end of the tether 316 is attached to a winch 330 that is anchored on the ground, thereby securing the entire balloon ride 310 to the ground. The tether 316, which can be a cable, rope, line or the like, passes over a pulley 332 so that the portion of the tether 316 between the pulley 332 and the vertex 329 assumes a generally upright orientation, which can be vertical or angled from vertical depending on local wind strength. The winch 330 is able to play out (deploy) and/or take up (retract) the tether 316, in order to allow the envelope 312 to rise or to lower the envelope 312, respectively. With this arrangement, the balloon ride 310 is capable of carrying passengers riding in the gondola 314 to a desired height above the ground before being reeled back down by the winch 330. The maximum height of rise is limited by the length of the tether 316. The envelope 312 is inflated with a lighter-than-air gas such as helium, hydrogen or hot air to provide the lift to the ride 310 and is preferably, although not necessarily, a sealed envelope.

During operation of the balloon ride 310, the load ring 318, load lines 326, equilibrium lines 327, guide line 331 and sliding element 333 operate to displace or offset the gondola 314 to the side and clear of the tether 316, wherever the balloon ride 310 may drift in the sky while attached to the tether 316. During calm conditions with little or no wind, the balloon envelope 312 is directly above the pulley 332 (as shown in FIG. 9), the sliding element 333 is at a relatively low point on the guide line 331, and the gondola 314 is suspended below the load ring 318, spaced laterally from the tether 316. During windy conditions, the balloon envelope 312 is pushed laterally in the direction of the wind so that the balloon envelope 312 is no longer directly above the pulley 332. This will cause the tether 316 to be deflected or slanted off vertical; the extent of the angular deflection of the tether 316 will depend on the strength of the wind. As the tether 36 is deflected, the sliding element 333 will slide upward on the guide line 331 (away from the load ring 318). This will allow the gondola 314 to remain relatively upright, with little or no tilt despite the angular deflection of the tether 316. Furthermore, because the gondola 314 is laterally offset from the tether 316, there is no contact between the tether 316 and the gondola 314 regardless of the angle of tether deflection. Thus, there is no tilt of the gondola 14 caused by physical contact of the gondola 314 with the tether 316.

While specific embodiments of the present invention have been described, it will be apparent to those skilled in the art that various modifications thereto can be made without departing from the spirit and scope of the invention as defined in the appended claims. For instance, although principally described in connection with passenger carrying amusement rides, the present invention can also be applicable to other types of tethered balloon rides, such as those designed to carry equipment rather than, or in addition to, passengers.

What is claimed is:

1. A tether system for use in a balloon ride having a balloon envelope and a gondola, said tether system comprising:
   a load ring attached to said gondola;
   a plurality of load lines having two ends, a first end of each load line being connected to said balloon envelope and a second end of each load line being connected to said load ring;
   a plurality of equilibrium lines having first and second ends, said first end of each equilibrium line being connected to said balloon envelope and said second ends of said equilibrium lines being connected together at a vertex;
   a tether connected to said vertex; and
   a guide line extending between said vertex and said load ring and wherein said tether is slidingly connected to said guide line.

2. The tether system of claim 1 wherein said load lines and said equilibrium lines vary in length.

3. The tether system of claim 1 further comprising a winch for deploying and/or retracting said tether.

4. The tethered balloon ride of claim 1 wherein said second ends of said load lines are distributed around said load ring.

5. The tethered balloon ride of claim 1 wherein said vertex is offset from said load ring.

6. A tethered balloon ride comprising:
   a balloon envelope;
   a tether having first and second ends;
   a rigid structural component having a triangular frame construction with first, second and third connection points; and
   a gondola connected to said rigid structural component, wherein said balloon envelope is pivotally connected to said first connection point, said gondola is pivotally connected to said second connection point, and said first end of said tether is pivotally connected to said third connection point so that said gondola is offset from said tether so as to minimize contact with said tether.

7. The tethered balloon ride of claim 6 further comprising a winch to which said second end of said tether is connected.

8. The tethered balloon ride of claim 6 wherein said gondola has a continuous base.

9. The tethered balloon ride of claim 6 wherein said balloon envelope is a sealed envelope containing a lighter-than-air gas.

10. A tethered balloon ride comprising:
    a balloon envelope;
    a load ring;
    a gondola connected to said load ring;
    a plurality of load lines having two ends, a first end of each load line being connected to said balloon envelope and a second end of each load line being connected to said load ring;
    a plurality of equilibrium lines having first and second ends, said first end of each equilibrium line being connected to said balloon envelope and said second ends of said equilibrium lines being connected together at a vertex;
    a tether having first and second ends, wherein said first end of said tether is attached to said vertex; and
    a guide line extending between said vertex and said load ring and wherein said tether is slidingly connected to said guide line.

11. The tethered balloon ride of claim 10 wherein said load lines and said equilibrium lines vary in length.

12. The tethered balloon ride of claim 10 wherein said second ends of said load lines are distributed around said load ring.

13. The tethered balloon ride of claim 10 wherein said vertex is offset from said load ring.

14. The tethered balloon ride of claim 10 wherein said balloon envelope is spherical.

15. The tethered balloon ride of claim 10 further comprising a winch to which said second end of said tether is connected.

16. The tethered balloon ride of claim 10 wherein said gondola has a continuous base.

* * * * *